(12) United States Patent
Wischnewskiy et al.

(10) Patent No.: US 11,043,908 B2
(45) Date of Patent: Jun. 22, 2021

(54) ULTRASONIC MOTOR HAVING A DIAGONALLY EXCITABLE ACTUATOR PLATE

(71) Applicant: Physik Instrumente (PI) GmbH & Co. KG, Karlsruhe (DE)

(72) Inventors: Wladimir Wischnewskiy, Rathenow (DE); Alexej Wischnewski, Wörth (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 395 days.

(21) Appl. No.: 16/305,934

(22) PCT Filed: May 31, 2017

(86) PCT No.: PCT/DE2017/100463
§ 371 (c)(1),
(2) Date: Nov. 30, 2018

(87) PCT Pub. No.: WO2017/206992
PCT Pub. Date: Dec. 7, 2017

(65) Prior Publication Data
US 2019/0140559 A1  May 9, 2019

(30) Foreign Application Priority Data
Jun. 1, 2016 (DE) ............ 10 2016 110 124.9

(51) Int. Cl.
*H02N 2/02* (2006.01)
*H02N 2/00* (2006.01)
*H02N 2/06* (2006.01)

(52) U.S. Cl.
CPC ........... *H02N 2/026* (2013.01); *H02N 2/0025* (2013.01); *H02N 2/0075* (2013.01); *H02N 2/065* (2013.01)

(58) Field of Classification Search
CPC ...... H02N 2/026; H02N 2/065; H02N 2/0025; H02N 2/0075
See application file for complete search history.

(56) References Cited

U.S. PATENT DOCUMENTS

| 8,928,205 B2 * | 1/2015 | Koc | H02N 2/002 310/323.02 |
| 9,246,413 B2 * | 1/2016 | Masuda | H02N 2/026 |
(Continued)

FOREIGN PATENT DOCUMENTS

| CN | 103259449 A | 8/2013 |
| DE | 102012105189 A1 | 12/2013 |
(Continued)

OTHER PUBLICATIONS

Office Action (Notice of Grounds of Rejection) dated Feb. 4, 2020, by the Japanese Patent Office in corresponding Japanese Patent Application No. 2018-563113, and an English Translation of the Office Action. (14 pages).
(Continued)

*Primary Examiner* — Emily P Pham
(74) *Attorney, Agent, or Firm* — Buchanan Ingersoll & Rooney PC (57) ABSTRACT

An ultrasonic motor, is disclosed having an ultrasonic actuator in the form of a rectangular piezo-electric plate, which has two generators for acoustic standing waves and on which at least two friction elements are arranged, an element to be driven, and an electric excitation device. The piezo-electric plate of the actuator is divided into two pairs of diagonally oppositely disposed sections by two virtual planes which extend perpendicularly to each other and which extend through the center line of the main surfaces of the actuator, wherein each of the generators includes two parts which can be operated in an antiphase manner and each of which is arranged in a diagonal section of the piezoelec-
(Continued)

tric plate, and the friction elements are arranged on one or two end faces of the piezoelectric plate.

7 Claims, 11 Drawing Sheets

(56) References Cited

U.S. PATENT DOCUMENTS

| | | | | |
|---|---|---|---|---|
| 2001/0011858 | A1* | 8/2001 | Lino | H02N 2/103 |
| | | | | 310/323.06 |
| 2012/0169181 | A1* | 7/2012 | Lee | H01L 41/0986 |
| | | | | 310/323.16 |
| 2015/0318801 | A1* | 11/2015 | Kamijo | H02N 2/0075 |
| | | | | 310/323.02 |
| 2017/0126147 | A1 | 5/2017 | Wischnewskiy et al. | |

FOREIGN PATENT DOCUMENTS

| | | |
|---|---|---|
| DE | 102014209419 B3 | 5/2015 |
| JP | 2010158143 A | 7/2010 |

OTHER PUBLICATIONS

International Search Report (PCT/ISA/210) dated Aug. 28, 2017, by the European Patent Office as the International Searching Authority for International Application No. PCT/DE2017/100463.

Written Opinion (PCT/ISA/237) dated Aug. 28, 2017, by the European Patent Office as the International Searching Authority for International Application No. PCT/DE2017/100463.

\* cited by examiner

ULTRASONIC MOTOR HAVING A DIAGONALLY EXCITABLE ACTUATOR PLATE

The invention relates to an ultrasonic motor according to claim 1.

An ultrasonic motor is known from DE 10 2014 209 419 B3 in which the ultrasonic actuator is designed as a rectangular piezoelectric plate having generators for acoustic diagonal waves and having two friction elements thereon. The generators of the acoustic waves of this motor consist of two parts that are electrically connected in series. This leads to a 2-fold increase of the electrical excitation voltage of the motor. In addition, the known configuration is characterized by a significant difference in terms of the shape of the trajectory of the friction elements, which in turn results in increased abrasion of its friction contact result and to a reduction in the service life of the motor. In addition, the difference in the shape of the trajectories of the friction elements causes high non-uniformity of the motion of the element to be driven at low speeds of motion. All this together reduces the field of application of this motor.

The object of the invention is therefore to provide an ultrasonic motor which can be operated at a lower electrical excitation voltage, which exhibits less abrasion within the friction contact, and which has a longer service life and improved uniformity of the motion of the element to be driven at low speeds of motion.

This object is satisfied with an ultrasonic motor according to claim 1, where the subsequent dependent claims represent at least advantageous further developments.

Hereinafter, the terms "ultrasonic actuator" and "actuator" shall be used synonymously.

It is assumed that an ultrasonic motor comprising an ultrasonic actuator in the form of a rectangular piezoelectric plate having two largest main surfaces in terms of area and the two main surfaces connecting side surfaces to each other, where the ultrasonic actuator has two generators for generating acoustic standing waves and at least two friction elements disposed on at least one of the side surfaces. Furthermore, the ultrasonic motor has an element to be driven and an electrical excitation device.

The piezoelectric plate of the actuator can be divided into two pairs of diagonally oppositely disposed sections by two virtual planes which extend perpendicularly to each other and which extend through the center line of the main surfaces of the actuator, wherein each of the generators consists of two parts which can be operated in an antiphase manner, each of which is arranged in a diagonal section of the piezoelectric plate, and the friction elements are arranged on a side surface which represents an end face or on two oppositely disposed end faces.

It can be advantageous to have the piezoelectric plate be in the shape of a square or a parallelepiped.

It can also be advantageous to have the generators of the acoustic standing wave have a three-layer or multi-layer configuration consisting of layers of excitation electrodes, of layers of common electrodes, and of layers of piezoelectric ceramic between them.

Furthermore, it can be advantageous if diagonal acoustic standing waves can be generated by the generators for acoustic standing waves in the actuator of the ultrasonic motor, which propagate in the direction of one or both diagonals of one of the main surfaces of the piezoelectric plate.

Furthermore, it can be advantageous to have the electrical excitation device of the actuator have a change-over switch for connecting the one or the other generator for acoustic waves to the actuator actuated by the electrical voltage.

In addition, it can be advantageous for the electrical excitation device to have a block which generates an additional electrical voltage for exciting the second acoustic wave generator.

It can there be advantageous for the block to change the phase of the additional electrical voltage in relation to the phase of the primary electrical voltage.

In addition, it can be advantageous for the block to change the amplitude of the additional electrical voltage.

Figure 1:
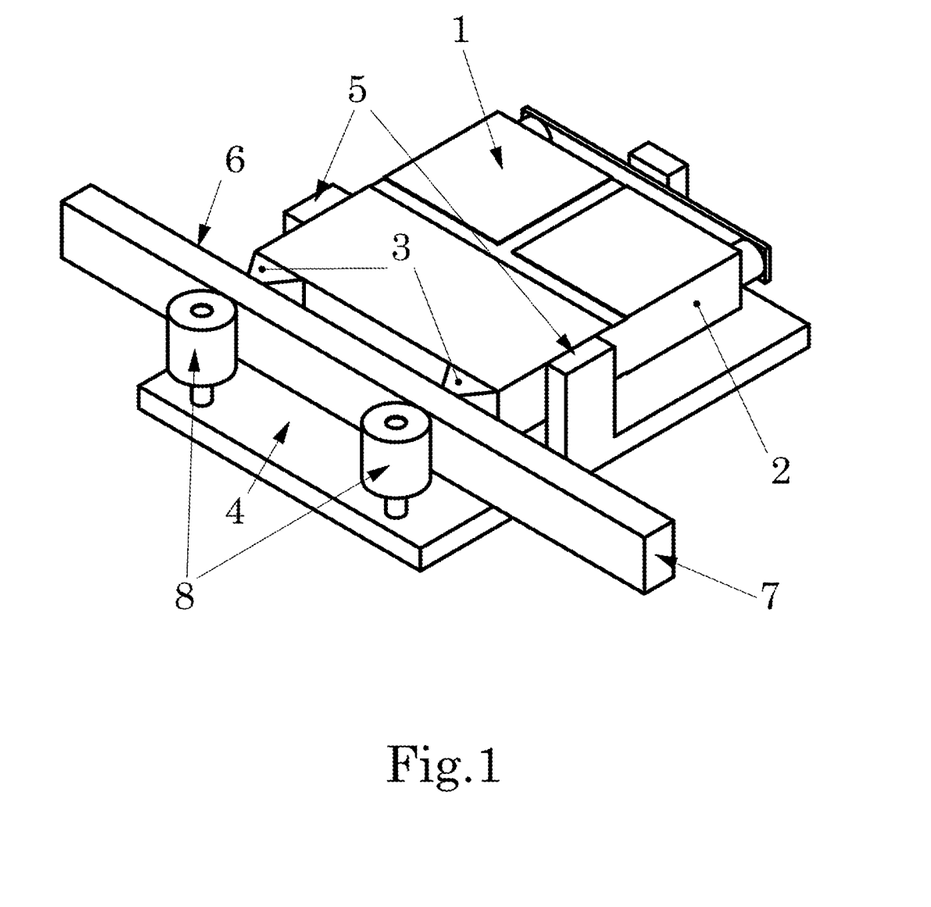
FIG. 1: shows an embodiment of an ultrasonic motor according to the invention.

FIG. 1 shows a possible embodiment of an ultrasonic motor according to the invention comprising an ultrasonic actuator 1 in the form of a rectangular piezoelectric plate 2 with two main surfaces in terms of area and four side surfaces connecting the two main surfaces to each other, where two friction elements 3 spaced from each are arranged on one of the side surfaces representing an end face of the ultrasonic actuator such that each of the friction elements adjoins the end face of the respectively adjacent side surface of the ultrasonic actuator. Actuator 1 is held or mounted in a housing 4 by way of supports 5. Friction elements 3 are pressed against friction layer 6 of element 7 to be driven which is mounted linearly movably or displaceably by way of ball bearings 8.

Figure 2:
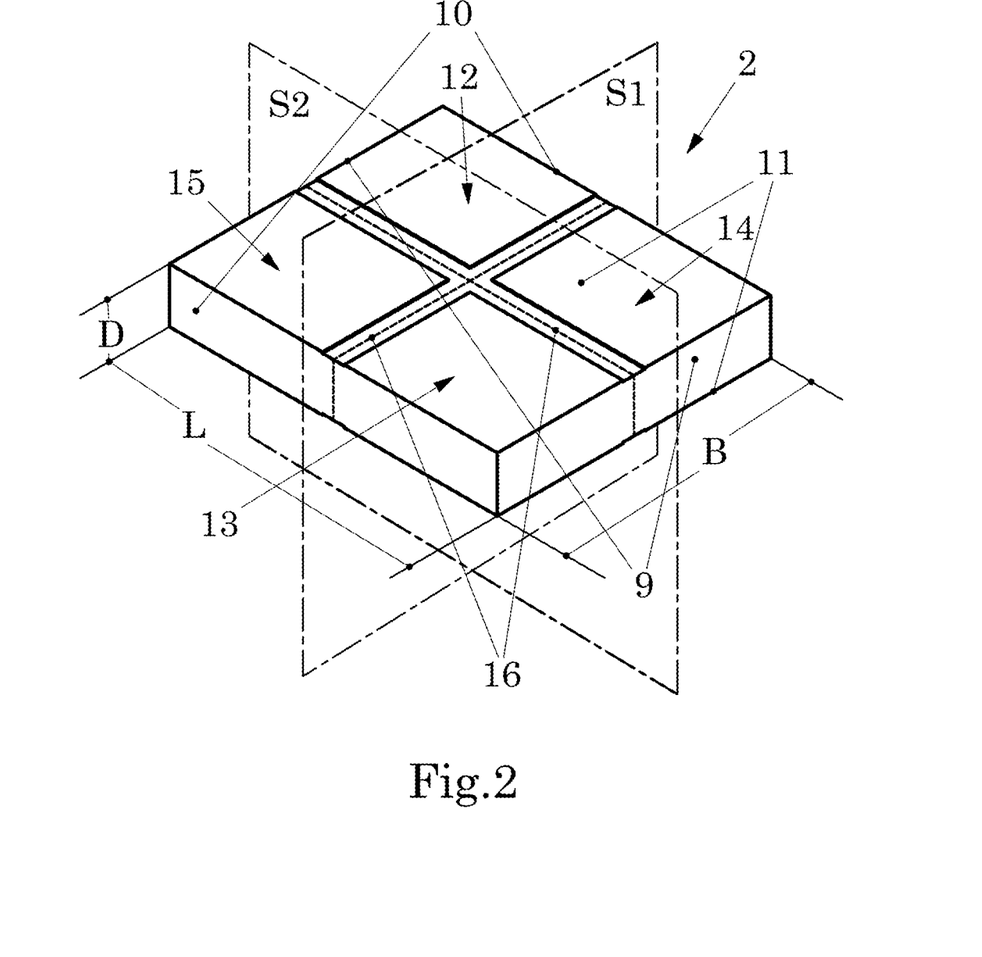
FIG. 2: shows an ultrasonic actuator of the ultrasonic motor according to FIG. 1 in a perspective representation.

FIG. 2 shows piezoelectric plate 2 of actuator 1 of FIG. 1 in detail. Plate 2 has a length L, a width B, and a thickness D. It has side surfaces 9, end faces 10, and largest main surfaces 11 in terms of area. End faces 10 are those side surfaces which in the assembled state of the ultrasonic motor are facing towards or respectively away from element 7 to be driven and on which friction elements 3 are arranged.

If length L is equal to width B, then the plate has the shape of a square. If length L is not equal to width B, then the plate has the shape of a parallelepiped. Plate 1 can be divided into the two pairs of diagonally oppositely disposed sections 12, 13 and 14, 15 by two virtual planes S1 and S2 which extend perpendicularly to each other. Planes S1 and S2 extend through the normal of center lines 16 of main surfaces 11 and perpendicular thereto.

Figure 3:
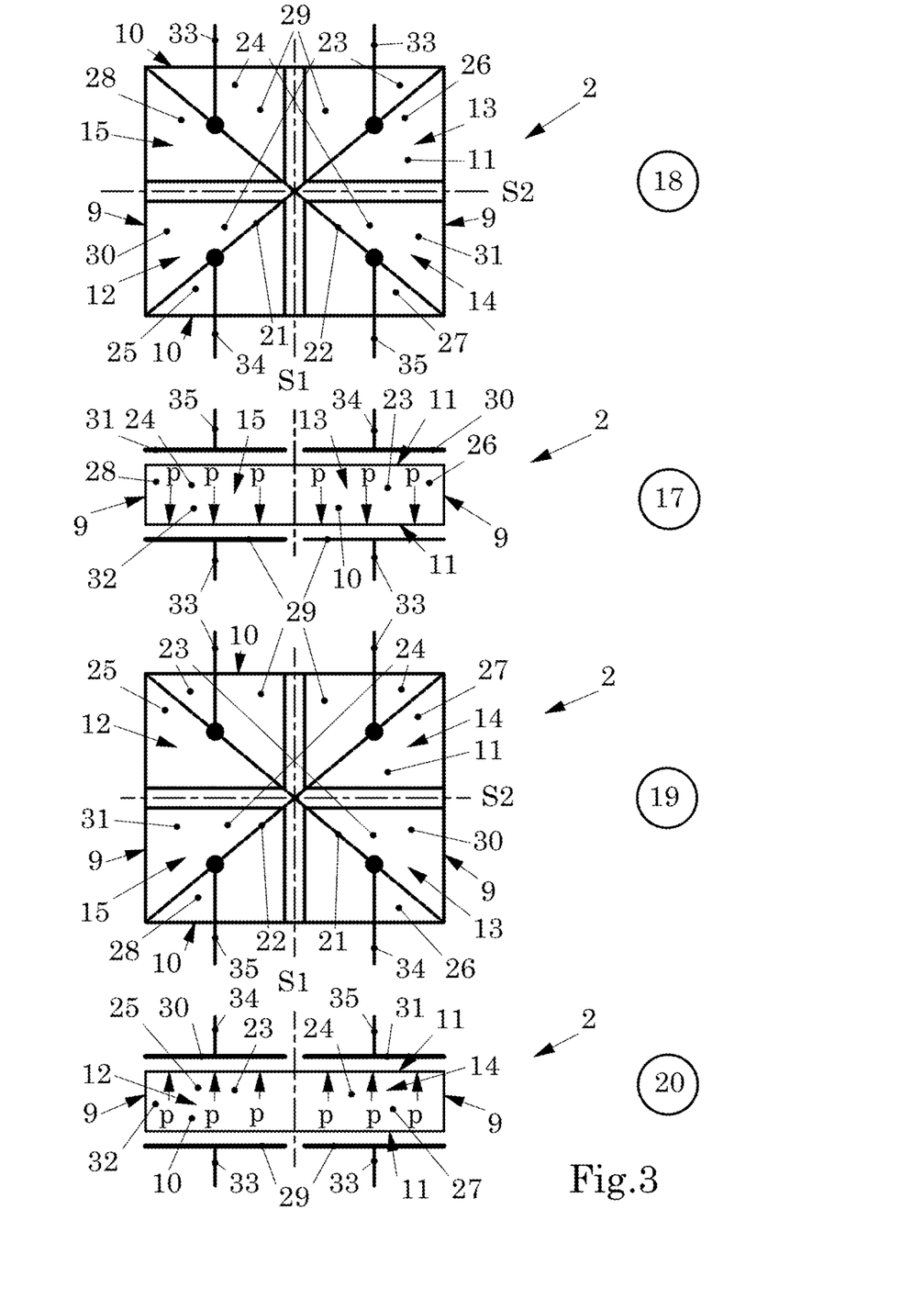
FIG. 3: shows different views of the ultrasonic actuator according to FIG. 1 in representations 17 to 20.

Representation 17 of FIG. 3 shows the front view of plate 2 of actuator 1 of FIG. 1 or FIG. 2, respectively. Representations 18 and 19 of FIG. 3 show the bottom view and the top view of plate 2, while representation 20 of FIG. 3 shows the rear view of plate 2. Disposed along the two diagonals 21 and 22 are the corresponding two pairs of diagonal sections 12, 13 and 14, 15. Piezoelectric plate 2 comprises two generators 23 and 24 for generating acoustic standing waves, where each of the generators 23 and 24 consists of two parts 25, 26 and 27, 28 actuated in an antiphase manner. Part 25 belongs to section 12, part 26 belongs to section 13, part 27 belongs to section 14, and part 28 belongs to section 15.

In the configuration of plate 2 shown in FIG. 3, generators 23 and 24 have a three-layer structure. Each part 25, 26 and 27, 28 of generators 23 and 24 comprises a layer with a common electrode 29, a layer with an excitation electrode 30, 31 and a layer of piezoelectric ceramic 32 between them. Electrodes 29, 30, 31 are arranged on the main surfaces of plate 2. The entire piezoceramic material of plate 2 is polarized in the direction shown in FIG. 3 by arrows with the index p. Common electrodes 29 of generators 23 and 24 comprise terminals 33, excitation electrodes 30 of generator 23 comprise terminals 34, and excitation electrodes 31 of generator 24 comprise terminals 35.

Figure 4:
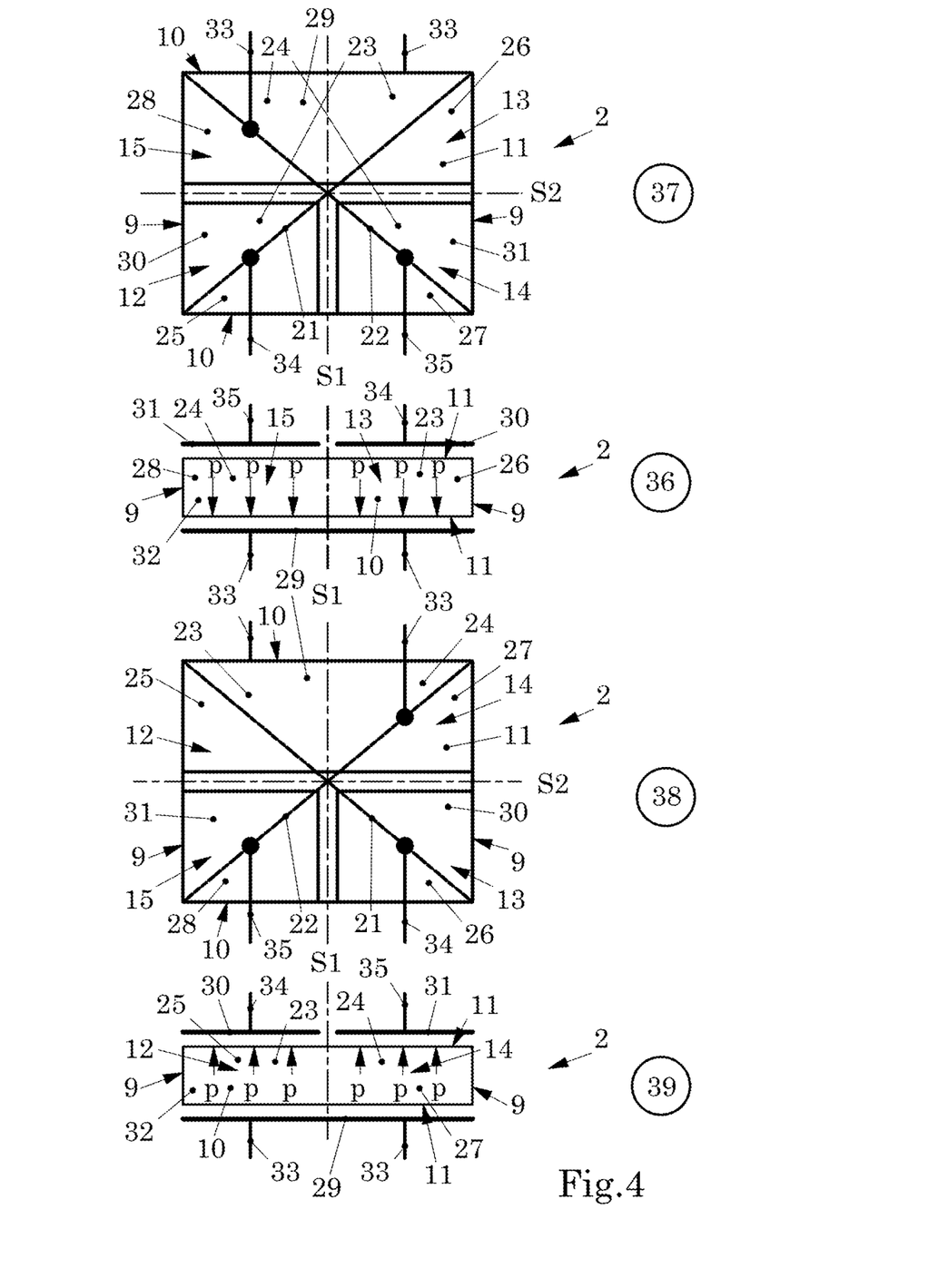
FIG. 4: shows the embodiment of an ultrasonic actuator of an ultrasonic motor according to the invention.

FIG. 4 in representations 36 to 39 shows a different structural configuration of an ultrasonic actuator 1 of an ultrasonic motor according to the invention with a three-layer structure of generators 23, 24 for the diagonal acoustic standing waves. Representation 36 shows the front view, representations 37 and 38, respectively, show the bottom view and the top view, and representation 39 shows the rear view. In this structural configuration of the ultrasonic actuator, common electrodes 29 of generators 23 and 24 are connected to each other.

Figure 5:
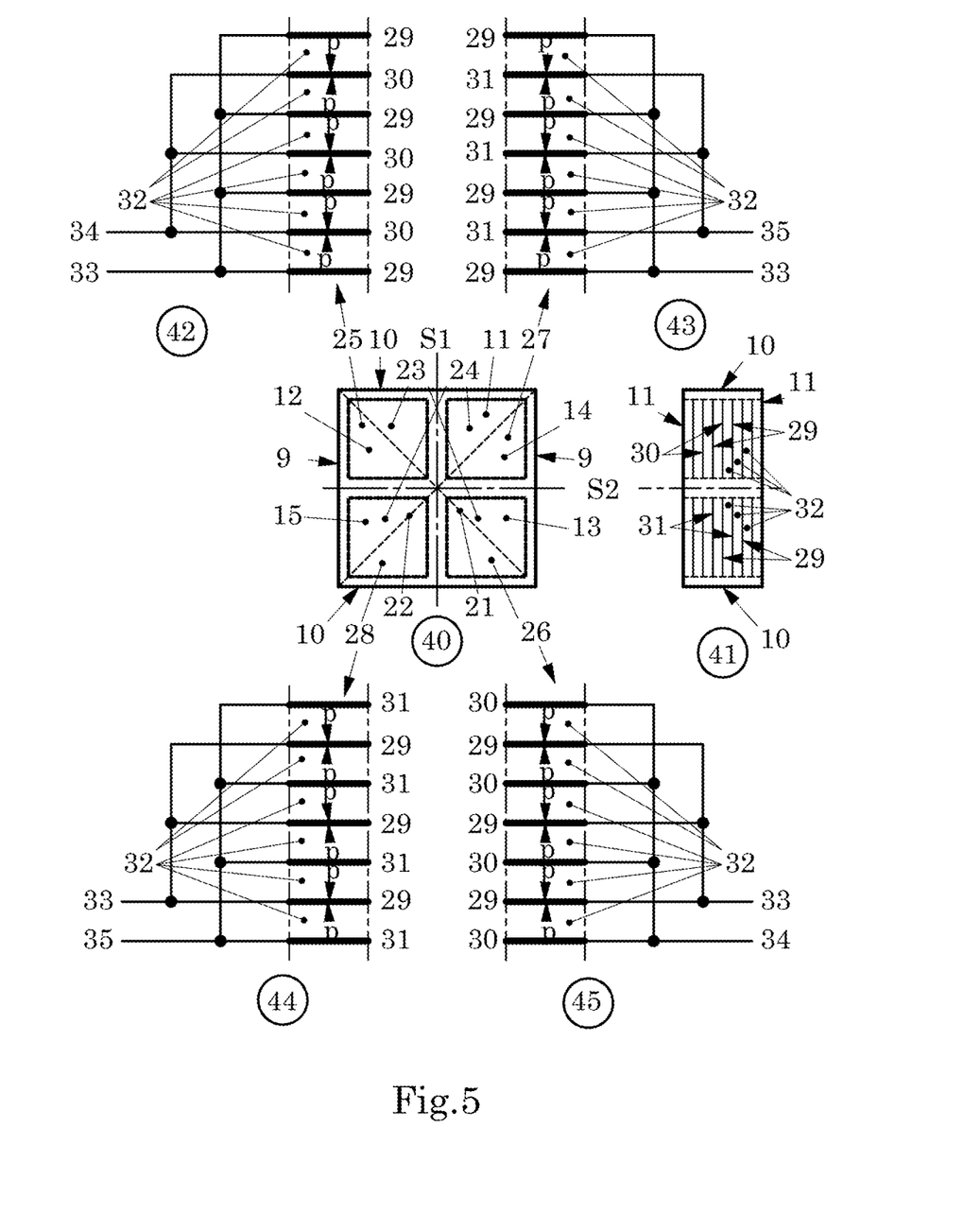
FIG. 5: shows the embodiment and the inner structure of an ultrasonic actuator of an ultrasonic motor according to the invention

Representation 40 of FIG. 5 shows the plan view onto an ultrasonic actuator 1 in which generators 23 and 24 have a multi-layer structure and represent multi-layer generators.

Representation 41 shows the corresponding side view of such an ultrasonic actuator. Representations 42, 45 and 43, 44 show the structure of parts 25, 26 and 27, 28, actuated in an antiphase manner, of multi-layer generators 23 and 24 of the diagonal acoustic standing waves. Each part 25, 26 and 27, 28 is composed of alternatingly disposed layers of excitation electrodes 30 and 31, of layers of common electrodes 29, and of piezoceramic layers 32 between them.

Figure 6:
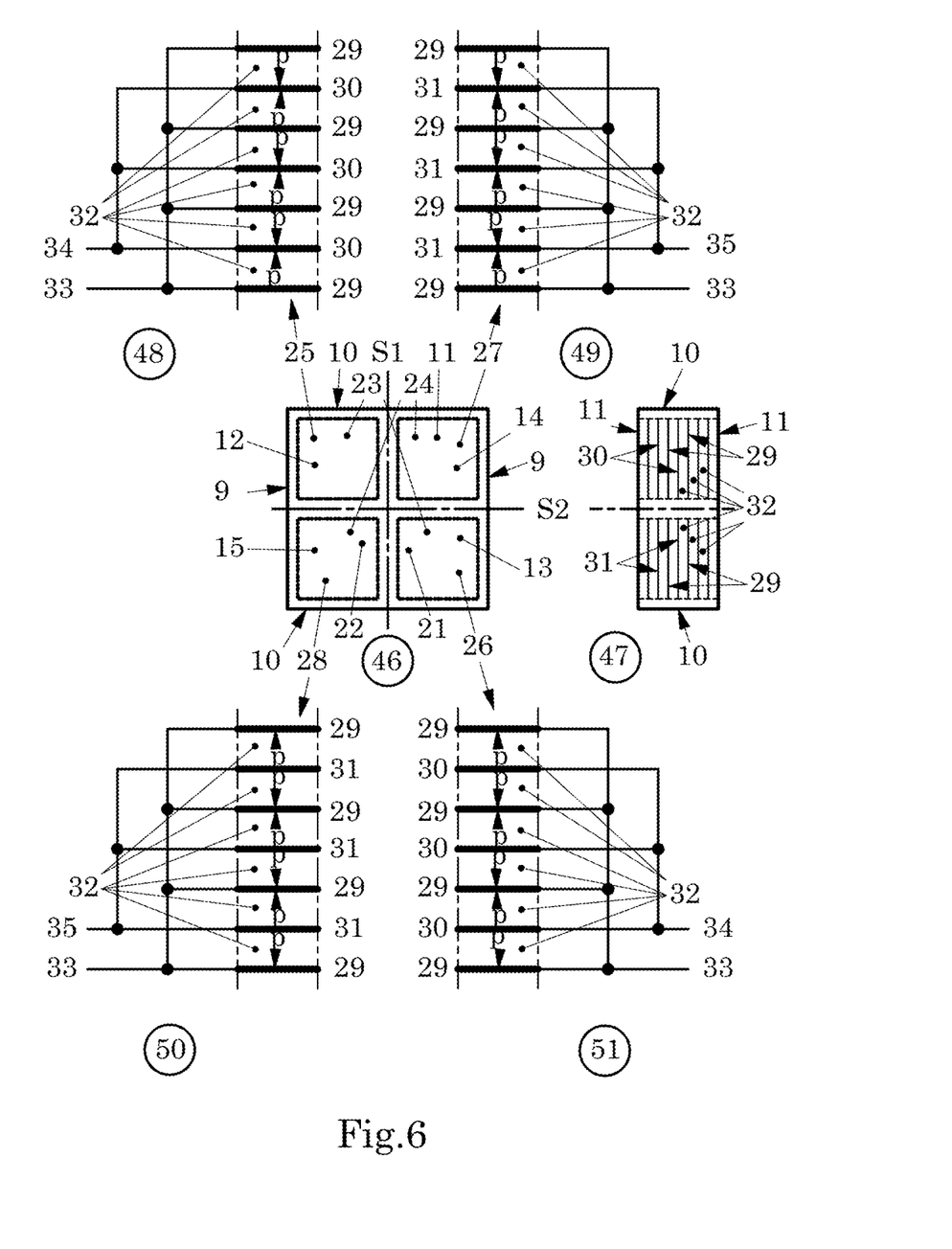
FIG. 6: shows the embodiment and the inner structure of an ultrasonic actuator of an ultrasonic motor according to the invention.

FIG. 6 shows a further structural configuration of an ultrasonic actuator of an ultrasonic motor according to the invention with multi-layer generators 23 and 24 for generating diagonal acoustic standing waves. Representation 46 shows the top view of such an ultrasonic actuator, while representation 47 shows the side view of the ultrasonic actuator. Representations 48, 51 and 49, 50 show the structure of parts 25, 26 and 27, 28, actuated in an antiphase manner, of multi-layer generators 23 and 24 for diagonal acoustic standing waves. Like in the embodiment of the ultrasonic actuator according to FIG. 5, electrode layers 29, 30, 31 are here arranged parallel to main surfaces 11 of plate 2.

Figure 7:
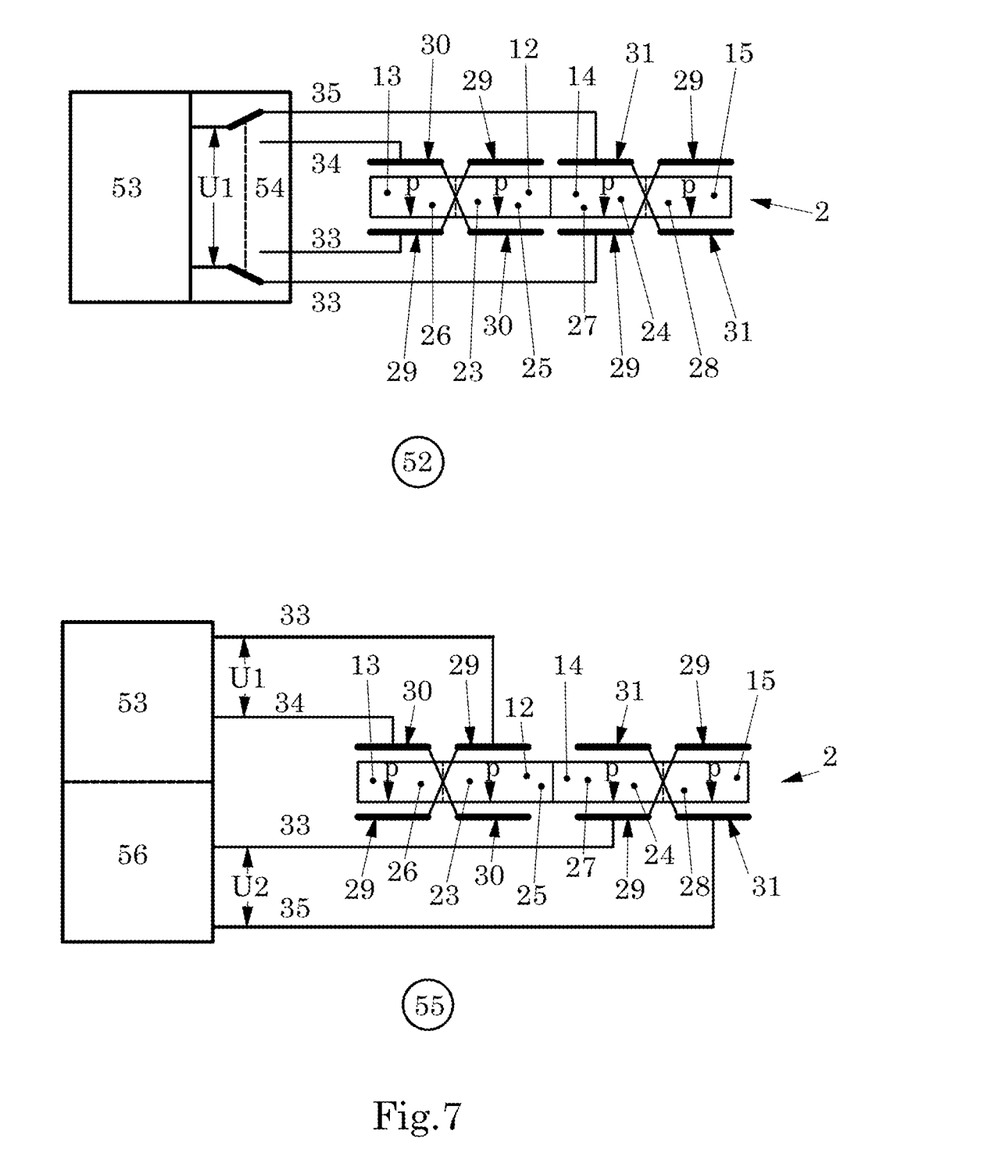
FIG. 7: shows two different connection diagrams (representations 52 and 55) for connecting the ultrasonic actuator of an ultrasonic motor according to the invention to an electrical excitation device.

Representation 52 of FIG. 7 shows a first connection diagram for connecting piezoelectric plate 2 of ultrasonic actuator 1 of an ultrasonic motor according to the invention to electrical excitation device 53. Electrical excitation device 53 generates the electrical alternating voltage U1, the frequency of which equals the resonance frequency of the second mode of the acoustic standing wave which propagates along or is close to diagonal 22 or 21 of piezoelectric plate 2. Voltage U1 is applied by way of change-over switch 54 to common electrodes 29 and to excitation electrodes 31 or 30 of generators 24 or 23. In the ultrasonic motor according to the invention, parts 27, 28 and 25, 26 of generators 24 and 23 are configured or actuated in an antiphase manner for generating the second mode of the diagonal acoustic wave. The parts are there connected to each other in parallel with voltage U1.

Representation 55 of FIG. 7 shows a second connection diagram for connecting piezoelectric plate 2 of actuator 1 of an ultrasonic motor according to the invention to electrical excitation device 53, where electrical excitation device 53 with a block 56 is provided an additional electrical voltage U2 having the same frequency as that of voltage U1. Depending on the selected operating scheme of the motor, voltage U2 can be phase-shifted with respect to voltage U1, namely by an angle in the range from zero to plus or minus 180°. During motor operation, this angle can be varied. In addition, the amplitude and voltage U2 can be altered.

Figure 8:
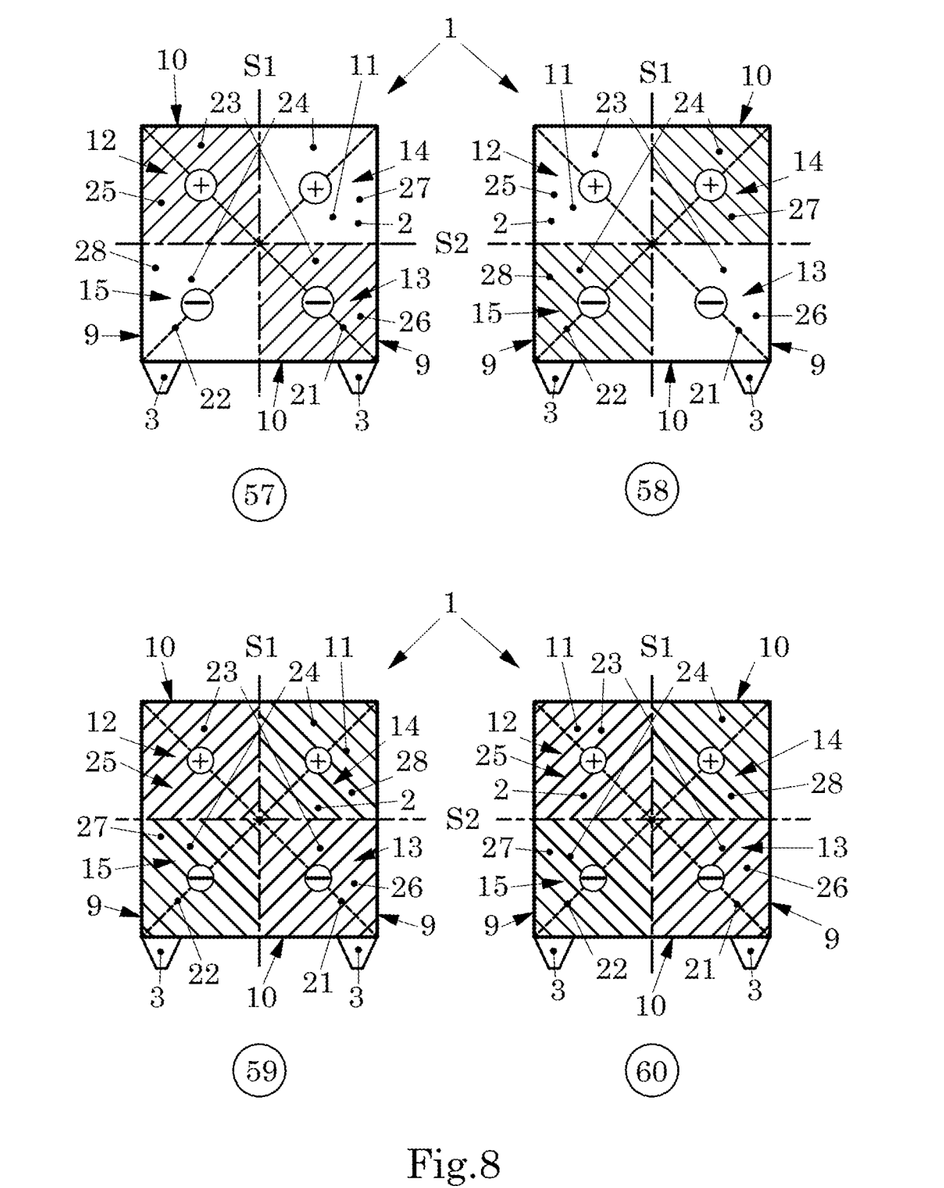
FIG. 8: representations 57 and 58: show the actuation or excitation principle of the ultrasonic actuator of the connection diagram according to representation 52 of FIG. 7; representations 59 and 60: show the actuation or excitation principle of the ultrasonic actuator of the connection diagram according to representation 55 of FIG. 7.

Representations 57, 58 and 59, 60 of FIG. 8 show the top view onto actuator 1 according to FIGS. 2 and 3, respectively, or according to FIGS. 5 and 6, respectively. Friction elements 3 are each disposed on one of the two end faces 10 of ultrasonic actuator 1. The antiphase nature of the parts of generators 25, 26 and 27, 28 in FIG. 8 is indicated by the index+/−. The term antiphase nature of parts 25, 26 and 27, 28 is to mean that each of the parts causes a deformation in plate 2 which is opposite relative to the other part.

The representations in FIG. 8 serve to explain the two principles for exciting actuator 1 by way of the corresponding connection diagrams illustrated in FIG. 7. In the first principle, only one generator, i.e. either only generator 24 (representation 58 in FIG. 8), or only generator 23 (representation 57 in FIG. 8) is actuated by way of electrical voltage U1 during operation of the motor. Switching the voltage is done with the aid of the change-over switch 54 (see representation 52 in FIG. 7). Generator 24 or generator 23, excited by voltage U1, in actuator 1 there generates the second mode of the diagonal acoustic standing wave which propagates along diagonal 22 or 21 of plate 2. In the second case (representation 59, 60 in FIG. 8), both generators 24 and 23 are excited simultaneously with the aid of voltages U1 and U2 during operation of the motor. Each of the generators 24 and 23 generates a diagonal acoustic standing wave in actuator 1 which propagates along its diagonal 22 or 21 of plate 2. In this case, the operating scheme of the motor corresponds to the connection diagram shown in representation 55 in FIG. 7. Parts 27, 28 and 25, 25 of actuated generators 24 and 23 in FIG. 8 are hatched for both connection diagrams.

Figure 9:
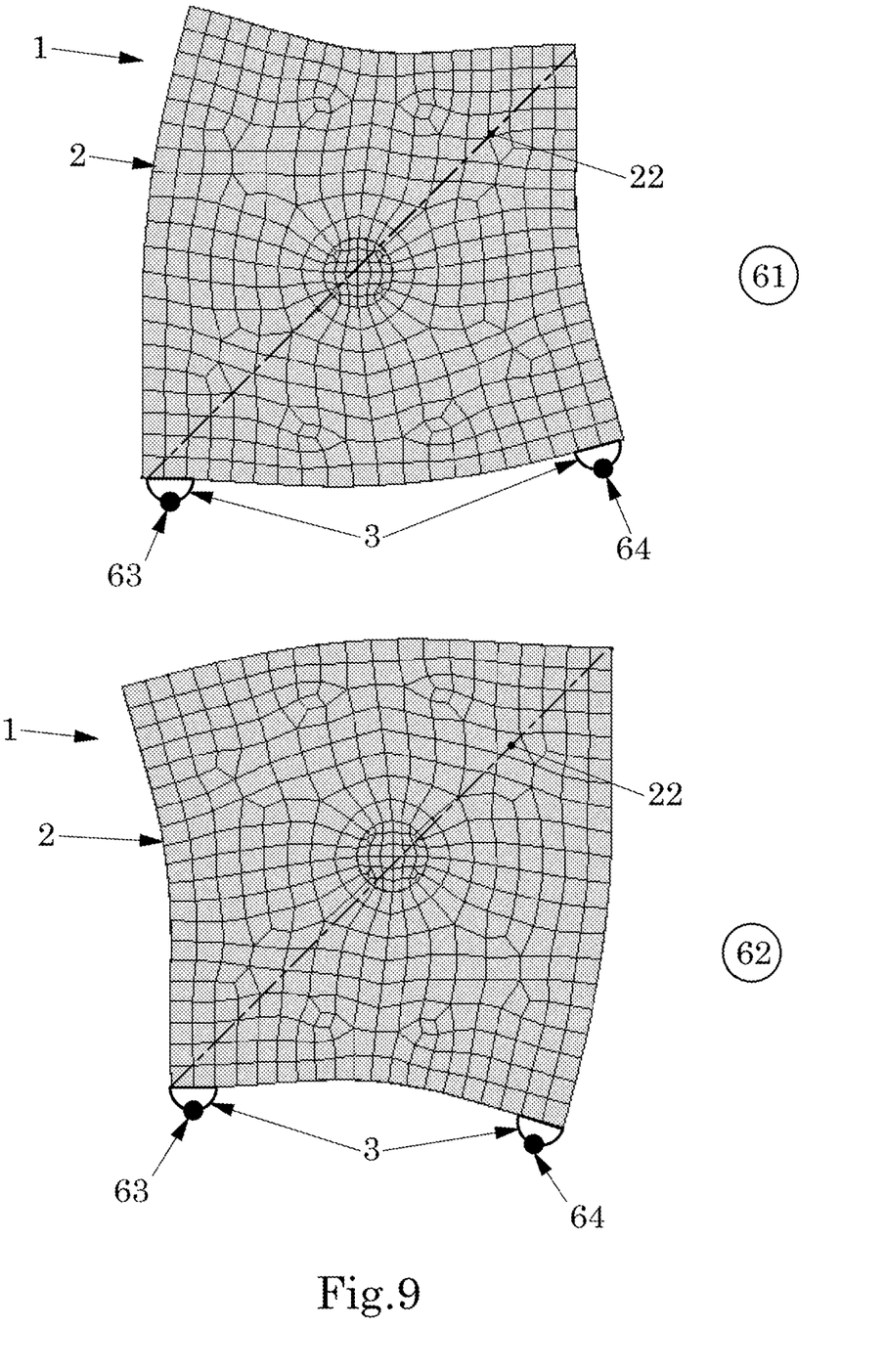
FIG. 9: shows calculated or simulated maximum deformations of an ultrasonic actuator of an ultrasonic motor according to the invention excited for the formation of standing waves in the ultrasonic actuator.

Representation 61 and 62 of FIG. 9 show the calculated or simulated maximum deformation of actuator 1 when a diagonal acoustic standing wave is generated therein which propagates along diagonal 22 of piezoelectric plate 2. In this case, the wave is generated by generator 24. Points 63 and 64 shown on the working surfaces of friction elements 3 of actuator 1 interact in the sense of a frictional connection with friction surface 6 of element 7 to be driven.

Figure 10:
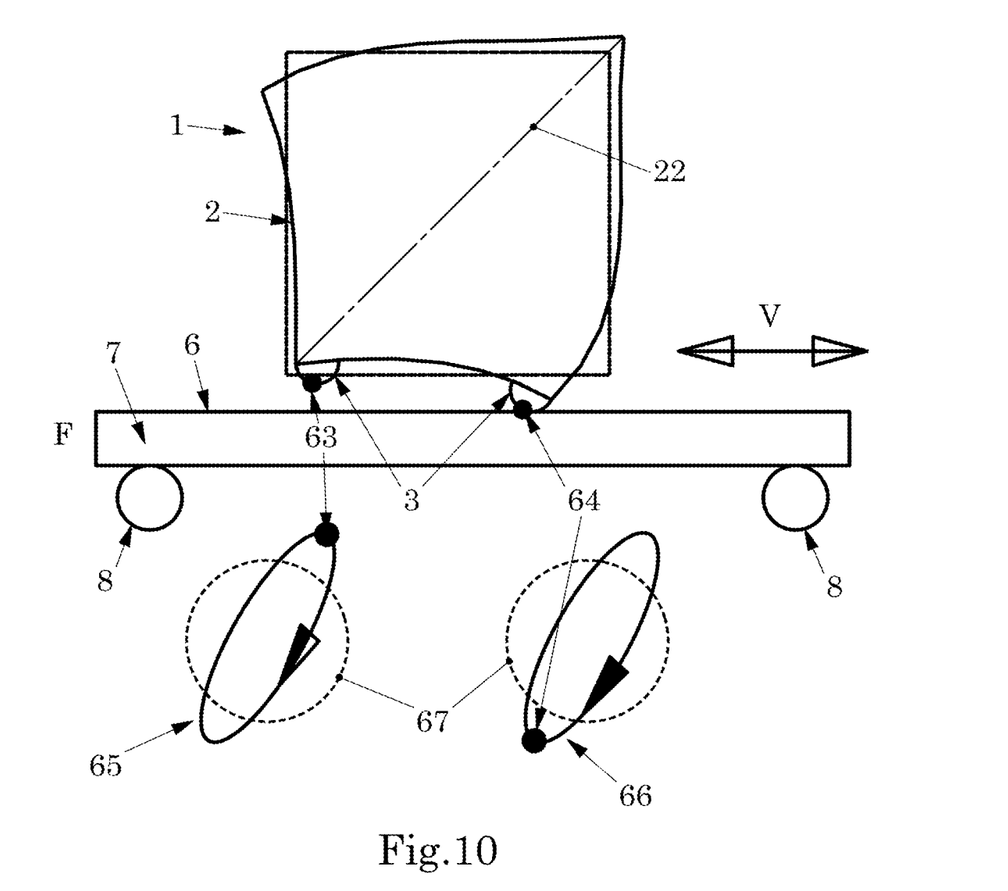
FIG. 10: shows a representation of the trajectories of the friction elements arranged on an ultrasonic actuator of an ultrasonic motor according to the invention.

In a diagonal acoustic standing wave generated by way of voltage U1 and propagating along diagonal 22 (representation 52 in FIG. 7), material points 63 and 64 of the working surfaces of friction elements 3 move on elliptical trajectories 65 and 66, shown in FIG. 10. The respective direction of motion is indicated by arrows. Since the part of piezoelectric plate 2 used by generator 23 is not electrically actuated during the excitation of generator 24 (see representation 58, FIG. 8), plate 2 is asymmetrically loaded by this part. Such a load on plate 2 leads to the compensation in trajectories 65 and 66, shown in FIG. 10. Compensation of trajectories 65 and 66 is there understood to mean that the dimensions of elliptical trajectories 65 and 66 for their respective two diameters and inclination angles of trajectories 65 and 66 in relation to friction layer 6 are practically equal.

The motion of all material points of the working surfaces of friction elements 3 on the elliptical trajectories leads to the creation of force F, which on the part of actuator 1 acts upon element 7 to be driven and sets it in motion. Upon actuation of changeover switch 54, voltage U1 excites generator 23, whereby an acoustic standing wave propagating along diagonal 21 is generated in actuator 1. With such a wave, the direction of motion of the material points of the surface of friction elements 3 reverses in the opposite direction. This leads to the reversal of the direction of motion of the element to be driven in the direction shown by the arrow.

Equal circular trajectories 67 of the material points of friction elements 3 can be realized with the simultaneous actuation of generator 24 by voltage U1 and generator 23 by additional voltage U2 or generator 23 by voltage U1 and generator 24 by additional voltage U2. This can be achieved by selecting the appropriate amplitude and phase of voltage U2. The direction of motion of element 7 to be driven can then be changed by reversing the phase shift angle between voltages U2 and U1.

Figure 11:
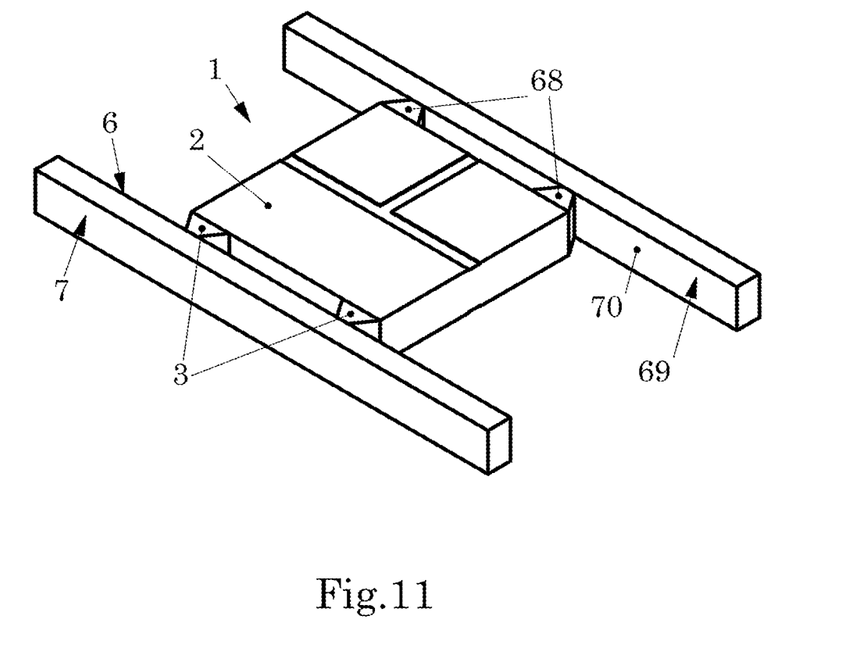
FIG. 11: shows an embodiment of the ultrasonic motor according to the invention.

FIG. 11 shows a further embodiment of an ultrasonic motor according to the invention in which ultrasonic actuator 1 contains two additional friction elements 68 and one additional element 70 to be driven having friction layer 69.

LIST OF REFERENCE NUMERALS

1: ultrasonic actuator
2: piezoelectric plate
3: friction element
4: housing
5: support
6: friction layer
7: element to be driven
8: ball bearing
9: side surface
10: end face
11: main surface
12,13,14,15: diagonal sections
16: center lines
21,22: diagonal
23, 24: generators for the diagonal acoustic standing waves
25, 26: parts of generator 23 actuated in an antiphase manner
27, 28: parts of generator 24 actuated in an antiphase manner
29: layer of the common electrode
30: layer of the excitation electrode of generator 23
31: layer of the excitation electrode of generator 24
32: piezoceramic layer
33: output of common electrode 29
34: output of excitation electrode 30
35: output of excitation electrode 31
53: electrical excitation device
54: changeover switch
56: phase and/or voltage control unit

The invention claimed is:

1. An ultrasonic motor, comprising:
an ultrasonic actuator formed as a rectangular piezoelectric plate;
an electrical excitation device; and
an element to be driven, wherein said ultrasonic actuator includes two generators for generating acoustic standing waves and at least two friction elements arranged on said ultrasonic actuator and configured for contacting said element to be driven, wherein said ultrasonic actuator is divided into two pairs of diagonally oppositely disposed sections by two virtual planes which extend perpendicularly to each other and which extend through center lines of main surfaces of said ultrasonic actuator, wherein each of said two generators includes two parts configured for operation in an antiphase manner and each of which is arranged in a different diagonal section, and said at least two friction elements are arranged on an end face of said ultrasonic actuator or on two opposite end faces of said rectangular piezoelectric plate, wherein said rectangular piezoelectric plate has a shape of a parallelepiped, of which the length is unequal to the width.

2. The ultrasonic motor according to claim 1, wherein said two generators for generating said acoustic standing waves have a multi-layer structure with at least one layer of excitation electrodes, at least one layer of a common electrode or of common electrodes, and at least one layer of piezoelectric ceramic material arranged between adjoining electrode layers.

3. The ultrasonic motor according to claim 1, wherein said two generators are configured for generating diagonal acoustic standing waves in said ultrasonic actuator of said ultrasonic motor, which will propagate in a direction of one or both diagonals of one of said main surfaces of said rectangular piezoelectric plate.

4. The ultrasonic motor according to claim 1, wherein said electrical excitation device of said ultrasonic actuator comprises:
a changeover switch for connecting one or the other of said two generators for acoustic waves to said ultrasonic actuator to be actuated by an electrical voltage.

5. The ultrasonic motor according to claim 4, wherein said electrical excitation device comprises:
a block for generating an additional electrical voltage for exciting the second one of said two generators for acoustic waves.

6. The ultrasonic motor according to claim 5, wherein said block is configured to change a phase of said additional electrical voltage in relation to a phase of a primary electric voltage.

7. The ultrasonic motor according to claim 5, wherein said block is configured to change an amplitude of said additional electrical voltage.

* * * * *